(12) United States Patent
Sarabandi et al.

(10) Patent No.: US 10,443,373 B2
(45) Date of Patent: Oct. 15, 2019

(54) COMPACT SINGLE CONDUCTOR TRANSMISSION LINE TRANSDUCER FOR TELEMETRY IN BOREHOLE DRILLING

(71) Applicant: The Regents of the University of Michigan, Ann Arbor, MI (US)

(72) Inventors: Kamal Sarabandi, Ann Arbor, MI (US); Seyed Mohammad Amjadi, Ypsilanti, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/628,553

(22) Filed: Jun. 20, 2017

(65) Prior Publication Data
US 2017/0362930 A1 Dec. 21, 2017

Related U.S. Application Data

(60) Provisional application No. 62/353,001, filed on Jun. 21, 2016.

(51) Int. Cl.
*E21B 47/12* (2012.01)
*G01V 1/52* (2006.01)
(Continued)

(52) U.S. Cl.
CPC .............. *E21B 47/12* (2013.01); *E21B 47/16* (2013.01); *G01V 1/52* (2013.01); *H01Q 13/20* (2013.01);
(Continued)

(58) Field of Classification Search
CPC ......................................................... H01P 3/10
See application file for complete search history.

(56) References Cited

U.S. PATENT DOCUMENTS

| | | | |
|---|---|---|---|
| 2,921,277 A | 1/1960 | Goubau | |
| 2003/0058186 A1* | 3/2003 | Saito ...................... | H01Q 1/242 343/895 |

(Continued)

OTHER PUBLICATIONS

Wikipedia ("Transverse Mode," Wikipedia, Jul. 21, 2015, accessed May 22, 2018, https://en.wikipedia.org/w/index.php?title=Transverse_mode&oldid=672401558).*

(Continued)

*Primary Examiner* — Laura N Nguyen
(74) *Attorney, Agent, or Firm* — Reising Ethington P.C.

(57) ABSTRACT

A borehole drilling communication system that includes a hydraulic drill, a communication module, and a transducer. The hydraulic drill has a drill pipe and a drill head where the communication module is located, The transducer has an input end and is mounted on the drill pipe adjacent the communication module. The communication module includes a first output terminal electrically connected to the drill pipe and a second output terminal electrically connected to the input end of the transducer. The transducer includes a helical conductor that is positioned coaxially over a section of the drill pipe at the drill head, with the helical conductor terminating at an electrically isolated free end. During use in borehole drilling, data sent from the communication module is launched by the transducer and transmitted along the drill pipe as a single conductor transmission line.

16 Claims, 13 Drawing Sheets

(51) Int. Cl.
*H01Q 13/26* (2006.01)
*H01Q 13/20* (2006.01)
*E21B 47/16* (2006.01)
*G01V 1/22* (2006.01)

(52) U.S. Cl.
CPC .............. *H01Q 13/26* (2013.01); *G01V 1/22* (2013.01); *G01V 2001/526* (2013.01)

(56) References Cited

U.S. PATENT DOCUMENTS

| | | | |
|---|---|---|---|
| 2003/0209347 A1* | 11/2003 | Clark | E21B 43/086 166/250.01 |
| 2004/0061622 A1* | 4/2004 | Clark | G01V 3/28 340/854.6 |
| 2008/0061789 A1* | 3/2008 | Coates | E21B 47/122 324/333 |
| 2009/0085767 A1* | 4/2009 | Cartwright | E21B 7/046 340/853.1 |
| 2016/0061985 A1* | 3/2016 | Okonkwo | E21B 47/011 324/333 |
| 2016/0312598 A1* | 10/2016 | Samuel | E21B 44/00 |
| 2017/0016317 A1* | 1/2017 | Roberson | E21B 47/122 |

OTHER PUBLICATIONS

Wikipedia "Antenna" ("Antenna (radio)", Wikipedia, Aug. 3, 2015, accessed May 22, 2018, https://en.wikipedia.org/w/index.php?title=Antenna_(radio)&oldid=674411053).*

M. A. Gutierrez-Estevez et al., "Acoustic Broadband Communications Over Deep Drill Strings Using Adaptive OFDM", IEEE Wireless Communications and Networking Conference (WCNC), Shanghai, pp. 4089-4094, 2013.

H. Djikpesse et al., "Reducing Uncertainty With Seismic Measurements While Drilling", IEEE Transactions on Instrumentation and Measurement, vol. 59, No. 1, pp. 4-14, Jan. 2010.

M. Y. Xia et al., "Attenuation Predictions at Extremely Low Frequencies for Measurement-While-Drilling Electromagnetic Telemetry System", IEEE Transactions on Geoscience and Remote Sensing, vol. 31, No. 6, pp. 1222-1228, Nov. 1993.

Y. Long et al., "Electromagnetic Field Due to a Loop Antenna in a Borehole", in IEEE Transactions on Geoscience and Remote Sensing, vol. 34, No. 1, pp. 33-35, Jan. 1996.

M. Pöppelreiter et al., "Borehole Imaging Technology: Application Across the Exploration and Production Life Cycle", pp. 9-11, 2010.

R.F. Harrington, "Cylindrical Wave functions", Time Harmonic Electromagnetics, Wiley Interscience, NY, pp. 198-263, 2001.

B. K. Sternberg et al., "Electrical Parameters of Soils in the Frequency Range from 1 kHz to 1 GHz, Using Lumped-Circuit Methods", Radio Science, vol. 36, No. 4, pp. 709-719, Jul./Aug. 2001.

G. Goubau et al., "Investigation of a Surface-Wave Line for Long Distance Transmission", Antennas and Propagation, Transactions of the IRE Professional Group, vol. 3, No. 1, pp. 263-267, Aug. 1952.

G. Goubau, "On the Excitation of Surface Waves," Proceedings of the IRE, vol. 40, No. 7, pp. 865-868, Jul. 1952.

T. Akalin et al., "Single-Wire Transmission Lines at Terahertz Frequencies," IEEE Transactions on Microwave Theory and Techniques, vol. 54, No. 6, pp. 2762-2767, Jun. 2006.

* cited by examiner

COMPACT SINGLE CONDUCTOR TRANSMISSION LINE TRANSDUCER FOR TELEMETRY IN BOREHOLE DRILLING

TECHNICAL FIELD

The invention relates to communication techniques used in borehole drilling for acquiring data at the drill head.

BACKGROUND

Logging-While-Drilling (LWD) using a set of sensors at or near the drill bit to acquire data in real time has become an industry standard. This technique is used to direct high-angle and horizontal drilling to ensure cost-effective use of expensive drilling rigs. The collected data includes acoustic and rock mechanics, soil/rock density, gamma ray emission, nuclear magnetic resonance responses, and resistivity measurements. Also, Measurement While Drilling (MWD) tools provide essential information about the condition at the tip of the drill such as temperature, pressure, vibration, rotation speed of the drill bit, etc. to prevent tools failure. A robust and real-time data communication approach between the downhole drill head and the bore opening at the surface is used to transfer the data to the surface for logging. LWD/MWD data transmission is currently carried out by different techniques such as acoustic mud pulse telemetry, electromagnetic wireless links, and wired drill pipe technology. In acoustic mud pulse telemetry, the data is converted to pressure fluctuation which is then transmitted through the annular drilling mud fluid. Mud-pulse telemetry, however, provides a very low data rate and is not reliable. Electromagnetic wireless telemetry provides faster data transmission compared to acoustic mud pulse telemetry but is problematic in deep boreholes due to significant signal attenuation through the ground formation layers. Wired drill pipe technology utilizes electrical cables built into the drill pipe. This technology offers much faster data transmission, but is not commonly used as the required equipment is expensive and is prone to failure.

Outside the field of borehole drilling, there are known communication techniques using surface wave propagation on a single conductor transmission line (SCTL). To excite surface waves on a SCTL, a coaxial horn structure is normally used. However, the diameter of the horn-shape launcher is typically very large compared to the wavelength, resulting in large transverse electrical dimensions. These conventional launchers cannot be accommodated in standard boreholes and thus are not suitable for borehole communication.

SUMMARY

In accordance with an aspect of the invention there is provided a transducer for single conductor transmission lines. The transducer includes a helical conductor extending along a central axis from an input end to a free end, and an attachment structure connected to the helical conductor for mounting the helical conductor on a central single conductor line.

In accordance with another aspect of the invention there is provided a borehole drilling communication system that includes a hydraulic drill, a communication module, and a transducer. The hydraulic drill has a drill pipe extending from a first end to a second end, and has a drill head located at the second end of the drill pipe. The communication module is located on the drill pipe at the drill head. The transducer has an input end and is mounted on the drill pipe at the drill head adjacent the communication module. The communication module includes a first output terminal electrically connected to the drill pipe and a second output terminal electrically connected to the input end of the transducer. The transducer includes a helical conductor that is positioned coaxially over a section of the drill pipe at the drill head and that extends helically over the drill pipe for a distance from the input end and in a direction away from the second end, with the helical conductor terminating at an electrically isolated free end. During use in borehole drilling, data sent from the communication module is launched by the transducer and transmitted along the drill pipe as a single conductor transmission line.

In accordance with yet another aspect of the invention, there is provided a method of communicating data from a borehole drill head while drilling in soil. The method includes the steps of: (a) boring into soil using a hydraulic drill pipe having a drill head located at an end of the drill pipe; and (b) sending data from the drill head using the drill pipe as a single conductor transmission line.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
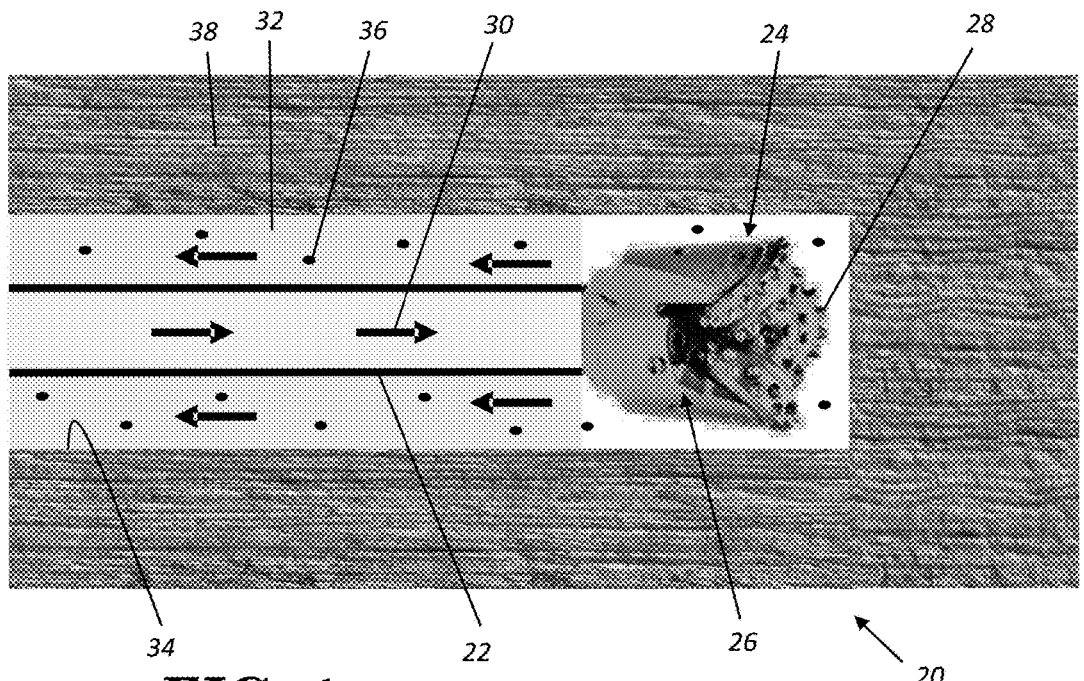
FIG. 1 is diagram depicting a hydraulic rotary-drilling mechanism of the type for which embodiments of the present invention may be used.

In hydraulic-rotary drilling, as shown in FIG. 1, a drilling rig 20 is used that includes a (hollow) hydraulic drill pipe 22 and drill head 24 having a downhole turbine motor 26 that is used for rotating a drill bit 28 by hydraulic pressure. The hydraulic power is provided by drilling fluid 30 that is forced through the drill pipe 22 to the turbine motor 26 and out of the drill head 24 where it then carries the cuttings (displaced soil) back to the surface through the annular space 32 between the drill pipe 22 and the sides of the borehole 34. The returning drilling fluid mixes with the soils displaced by the drill bit to form a mud 36. These components of the drilling rig 20 may be implemented using equipment and techniques known in the art.

Since the mud 36 has a much higher index of refraction than the surrounding soil, a drill pipe coated with the drilling mud can be used as a single conductor transmission line (SCTL) which is known to support TM surface waves. These surface waves propagate along the metallic pipe 22 and do not experience spherical wave propagation path-loss. These TM waves may be generated on the drill pipe 22 (acting as an SCTL) using a transducer (such as in FIG. 4B), which is referred to also herein as a launcher. To keep the attenuation underground low, the lower portion of electromagnetic spectrum at HF band is advantageously used. To achieve this, a miniaturized low-profile launcher of dimensions smaller than 0.005λ×0.005λ×0.03λ is disclosed herein that can be accommodated in boreholes for exciting the pipe-mud SCTL. Before describing a specific embodiment of the transducer and SCTL transmission from the borehole, the theory behind using the drill pipe coated with the drilling mud as a SCTL is presented. This theory provides the propagation constant and attenuation rate as a function of frequency and dielectric properties of the drilling mud and the surrounding soil/rock.

Figure 2A:
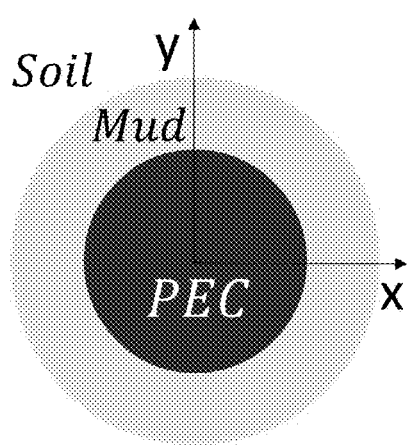
FIG. 2A is a cross-sectional view and FIG. 2B is a side sectional view of the geometry of a cylindrical conductor coated with a lossy dielectric (e.g., mud) immersed in another lossy dielectric medium (e.g., soil)
Figure 2B:
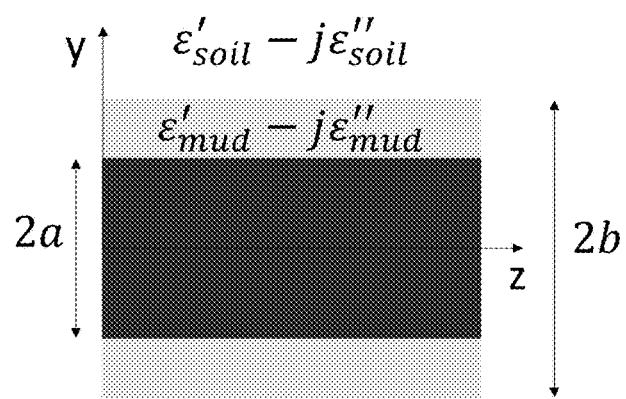

The attenuation rate and propagation constant of surface waves supported by mud-coated drill pipes may be estimated as a function of frequency and dielectric properties of mud and the surrounding soil/rock. Consider a metallic cylinder coated with a uniform lossy dielectric layer (mud) immersed in another lossy medium (soil/rock) as shown in FIG. 2. Dielectric coated metallic cylinders can support $TM^z$ surface waves. Using the standard method of separation of variables, it can easily be shown that this structure can support the dominant $TM^z$ surface wave mode provided that the following transcendental equations render a solution for the propagation constant in z-direction denoted by $\beta_z = \beta_z^{mud} = \beta_z^{soil}$:

$$\frac{K_0'(\alpha_\rho^{soil} b)}{K_0(\alpha_\rho^{soil} b)} = \frac{J_0'(\gamma_\rho^{mud} b) N_0(\gamma_\rho^{mud} a) - J_0(\gamma_\rho^{mud} a) N_0'(\gamma_\rho^{mud} b)}{J_0(\gamma_\rho^{mud} a) N_0(\gamma_\rho^{mud} b) - J_0(\gamma_\rho^{mud} b) N_0(\gamma_\rho^{mud} a)} \quad (1)$$

$$\beta_z^2 = \omega^2 \mu_{mud} \varepsilon_{mud} - (\gamma_\rho^{mud})^2 \quad (2)$$

$$\beta_z^2 = \omega^2 \mu_{soil} \varepsilon_{soil} + (\alpha_\rho^{soil})^2 \quad (3)$$

where $\alpha_\rho^{soil}$ and $\gamma_\rho^{mud}$ are the radial attenuation constants in soil and mud respectively. In (1), $J_0$, $N_0$, and $K_0$ are the zero$^{th}$ order Bessel function of the first kind, second kind, and the modified Bessel function of the second kind respectively.

The permittivity of the drilling mud as a function of frequency (1 MHz<f<15 MHz) is given by:

$$\varepsilon_{mud}(f(MHz)) \cong \varepsilon_0[80 f^{-0.24} - j2000 f^{-0.86}] \quad (4)$$

Figure 3A:
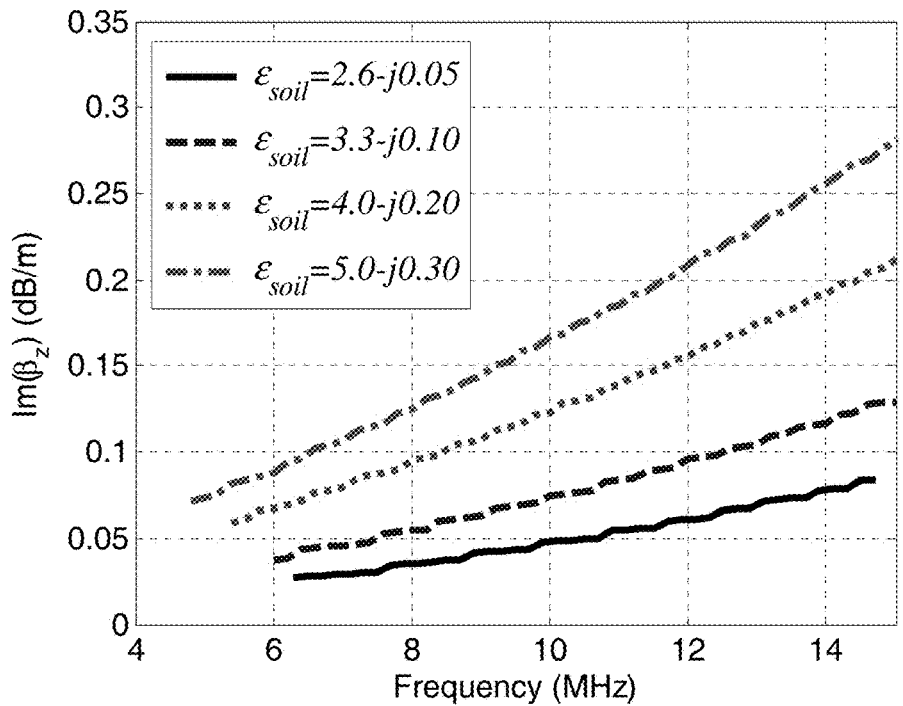
FIGS. 3A and 3B show respectively the imaginary part of $\beta_z$ and the real part of $\alpha_\rho^{soil}$ versus frequency for different humidity conditions of the background soil.
Figure 3B:
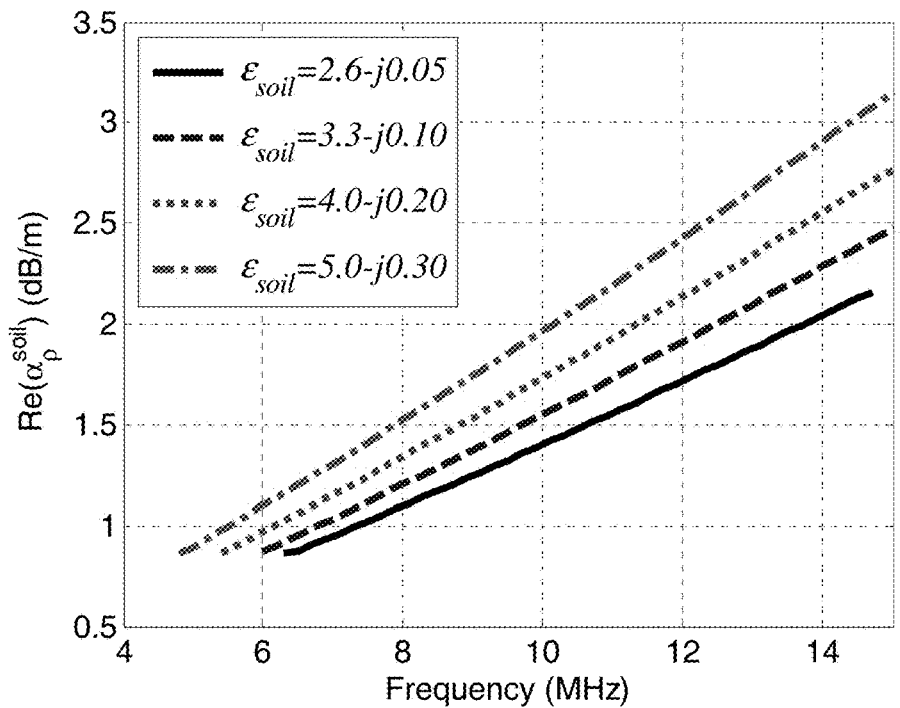

Solving (1-3) for $\beta_z$, $\alpha_\rho^{soil}$ and $\gamma_\rho^{mud}$ numerically, considering a drill pipe of radius a=5 cm and a borehole of radius b=12 cm, the imaginary part of $\beta_z$ (which represents attenuation in z-direction) and the real part of $\alpha_\rho^{soil}$ versus frequency for different dielectric constants of the background soil/rock are plotted in FIG. 3A and FIG. 3B, respectively, with $0.05 < \varepsilon''_{r,soil} < 0.3$ which corresponds to 15 μS/m<$\sigma_{soil}$<100 μS/m at 6 MHz. For low moisture contents, the permittivity of soil/rock from 1 MHz to 15 MHz is almost constant and is given in Table. I.

TABLE I

| Moisture content of soil/rock | Relative dielectric constant |
| --- | --- |
| 0% (dry) | 2.6 − j0.05 |
| ~1% | 3.3 − j0.1 |
| ~2% | 4 − j0.2 |
| ~3% | 5 − j0.3 |

Attenuation in z-direction is increased with frequency as can be inferred from FIG. 3A. The reason is that the electrical thickness of the mud layer around the drill pipe represented by $\Xi_\rho^{mud}(b-a)$ is increased with frequency and, thereby, the electric field is more bounded within the mud layer at high frequencies compared to low frequencies. Therefore, the operation frequency is chosen to be at lower frequencies. If the drilling mud is of higher conductivity, then the attenuation rate increases. For example if the conductivity of the drilling fluid is increased by a factor of 10 (from $\sigma_{mud}$=0.1 S/m to $\sigma_{mud}$=1 S/m), while the conductivity of the surrounding soil is fixed, then the attenuation constant (imaginary part of $\beta_z$) increases by a factor of 1.9 which corresponds to attenuation per unit length increase by a factor of 1.9. The surrounding medium is usually rock with very low moisture content. However, if the drilling path happens to be in a soil with higher moisture content, then the wave experiences higher attenuation. For the given dimensions, if the conductivity of the soil is increased by a factor of 10 (from 15 μS/m<$\sigma_{soil}$<100 μS/m to 150 μS/m<$\sigma_{soil}$<1000 μS/m), then the attenuation rate increases by a factor of 5.2 for the lower bound to 6.8 for the upper bound.

To excite a $TM^z$ surface wave on this line, a compact launcher with small transverse electrical dimensions may be used that fits within the limited available space inside the borehole. An embodiment 40 of this launcher is shown in FIGS. 4A and 4B.

Figure 4A:
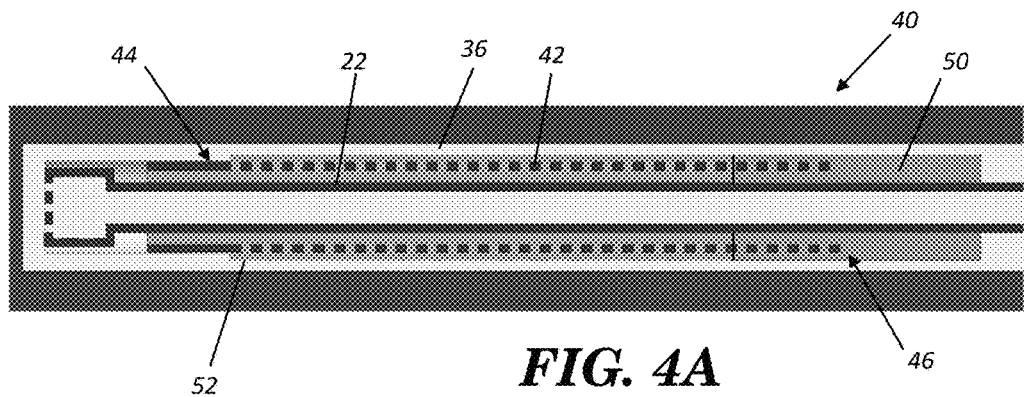
FIG. 4A is a cross-sectional view inside a drilled borehole, diagrammatically showing a drill head that includes a low-profile surface wave launcher (transducer) constructed in accordance with an embodiment of the invention.
Figure 4B:
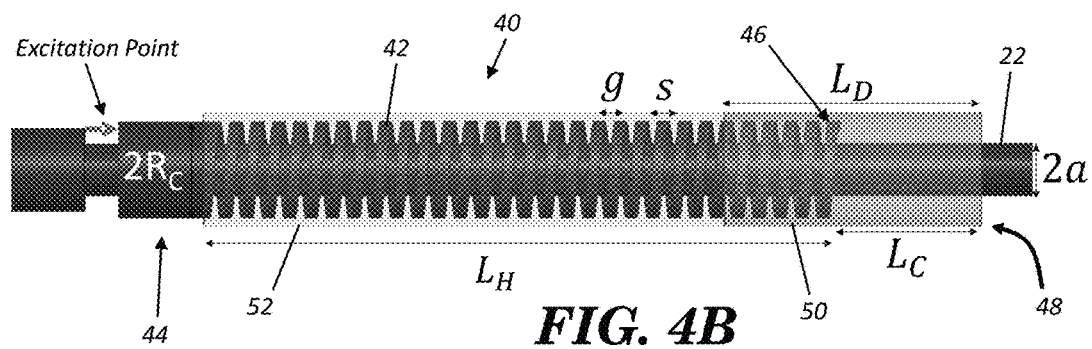
FIG. 4B is a side view of the drill head of FIG. 4A.

Referring now to FIGS. 4A and 4B, the launcher (transducer) 40 comprises an open ended helical conductor 42 of small diameter concentric with the (electrically-conductive) metallic drill pipe 22. The helical conductor 42 extends coaxially with the drill pipe 22 along a central axis from an input end 44 to a free end 46. The launcher 40 includes an attachment structure 48 connected to the helical conductor 42 for mounting the helical conductor on the drill pipe 22. The open side (free end) 46 of the helical conductor 42 is loaded by a cylindrical dielectric 50 which fixes it in position coaxially over the drill pipe 22. The dielectric 50 is embedded between the drill pipe and the helical conductor for mechanical support. The attachment structure may comprise this dielectric 50 and/or another dielectric such as the dielectric tube 52 shown in FIG. 4B fitting over the helical conductor 42 and extending from the first dielectric 50 to the input end 44 to seal the helical conductor 42 from the surrounding mud 36.

Figure 5:
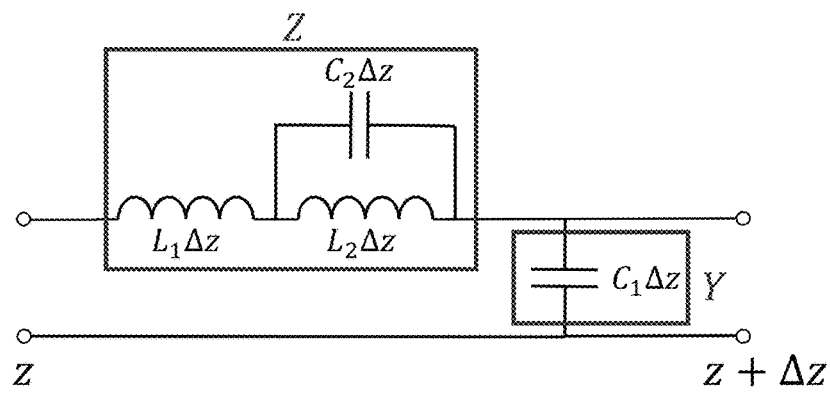
FIG. 5 is an equivalent circuit model of the transducer shown in FIG. 4B.

The launcher's input end 44 is a coaxial line (using the drill pipe 22 as a center conductor) that may be electrically energized by a conventional sensor/transceiver module (see FIG. 14) at the drill head to thereby create a transition from TEM mode to $TM^z$ mode on the SCTL and provides impedance matching between the two types of the wave. As the signal propagates from the coaxial line to the helical line, a component of the electric field is established in the gap between consecutive loops of the helix along the direction of propagation. Also, an axial magnetic field is excited due to the circulating current in the helix and on the inner conductor. Thus, the wave mode along the helix is a hybrid mode (combination of $TM^z$ and $TE^z$) which is then partially converted to $TM^z$ on the SCTL. The equivalent circuit model of this transmission line (cylindrical conductor concentrically surrounded by a helix) is illustrated in FIG. 5. The capacitor $C_1$ represents the capacitance between the inner conductor (drill pipe) and the helix and the inductor $L_1$ represents the inductance due to the axial current on the inner conductor and on the helix which generates a circular magnetic flux density. The capacitor $C_2$ models the capacitance between two consecutive loops of the helix and the inductor $L_2$ models the inductive effect of the circular current on the helix and on the inner conductor resulting in an axial magnetic flux density. The propagation constant and the characteristic impedance of this transmission line denoted by $\gamma_{launcher}$ and $Z_{launcher}$ are, respectively, given by:

$$\gamma_{launcher} = \sqrt{YZ} = \omega \sqrt{\frac{C_1(\omega^2 L_1 L_2 C_2 - L_1 - L_2)}{1 - \omega^2 L_2 C_2}} \quad (5)$$

$$Z_{launcher} = \sqrt{\frac{Z}{Y}} = \sqrt{\frac{L_1 + L_2 - \omega^2 L_1 L_2 C_2}{C_1 (1 - \omega^2 L_2 C_2)}} \quad (6)$$

which resembles a slow wave structure. The term $\sqrt{1-\omega^2 L_2 C_2}$ developed in the denominator of (5) and (6) due to the capacitor $C_2$ and the inductor $L_2$ allows quite large variations for $\gamma_{launcher}$ and $Z_{launcher}$ which in turn, if adjusted appropriately, makes it possible to provide wave and impedance transition from $TEM^z$ on the coaxial line to $TM^z$ on the SCTL at very low frequencies which is not feasible in the absence of $L_2$ and $C_2$. Moreover, the generated electric field in z-direction between adjacent loops of the helix which is required to excite $TM^z$ on the SCTL further assists this transition.

Similar to other transition configurations, such as coaxial to waveguide transitions, the transition mechanism of the proposed topology is, however, very complicated and cannot be explored analytically. Full-wave simulation is, thus, used to obtain the optimized values of the length and the pitch of the helix. Finite Difference Time Domain (FDTD) method is used for the full-wave analysis. The full-wave simulation and optimization is performed for the SCTL which is terminated by the proposed launcher at both ends. Since the extent of the wave interaction between the launcher and the SCTL reaches about one wavelength on the SCTL, the length of the SCTL in the full-wave simulation should be large enough so as to exclude the loading effect of the launchers on each other. Therefore, a line of length $10\lambda=300$ m is considered in the full-wave domain. The simulation domain is truncated at a distance of about one wavelength from the structure in the surrounding soil by Perfectly Matched Layer (PML) boundary. The launcher dimensions are listed in Table II.

TABLE II

| Parameter | Quantity | Parameter | Quantity |
|-----------|----------|-----------|----------|
| $L_H$ | 160 cm | s | 2.5 cm |
| $L_D$ | 80 cm | g | 2.8 cm |
| $L_C$ | 30 cm | $R_c$ | 10 cm |
| | | a | 5 cm |

Figure 6A:
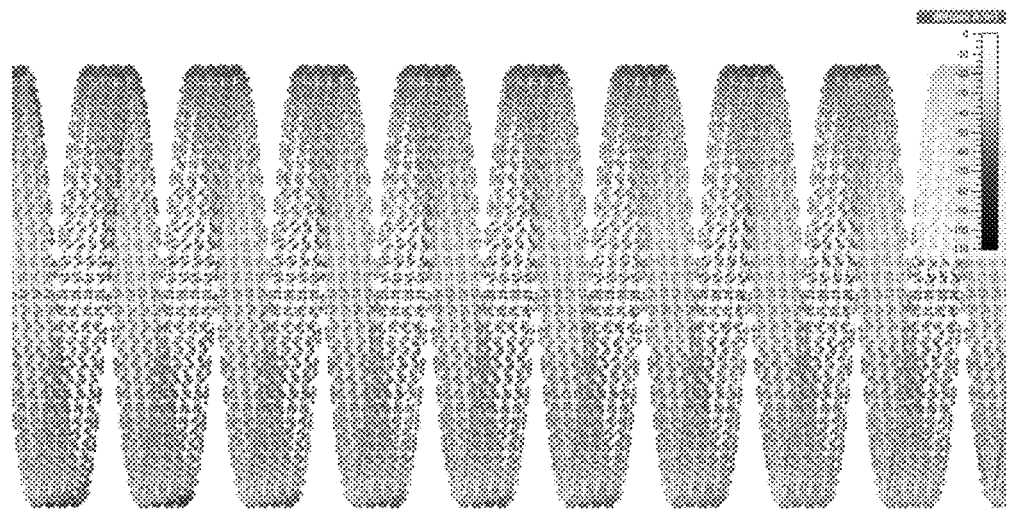
FIGS. 6A and 6B shows simulated current distribution on the helical coil and on the drill pipe, respectively of the transducer shown in FIG. 4B.
Figure 6B:
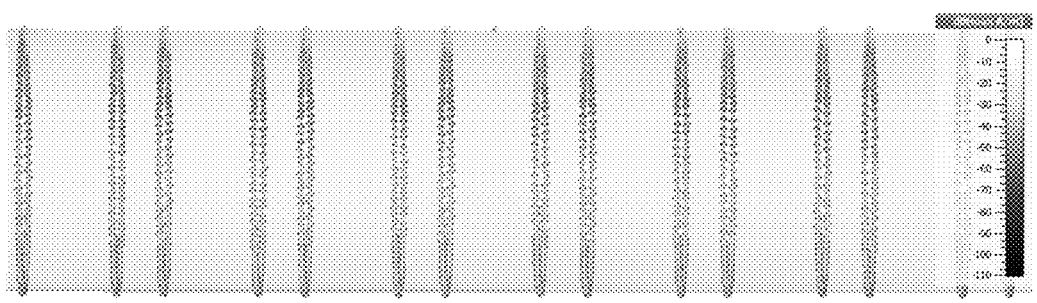
Figure 7A:
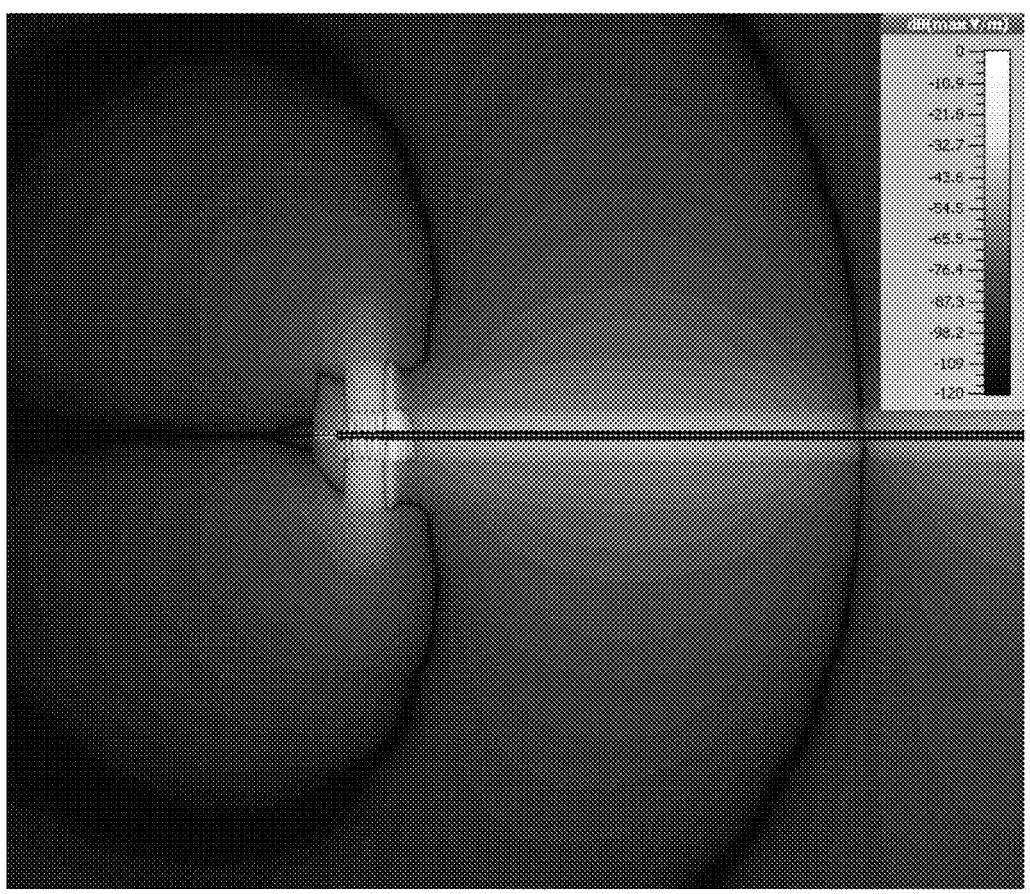
FIGS. 7A and 7B are simulations of the radial ($E_\rho$) electric field and axial ($E_z$) electric field, respectively, around the transducer shown in FIG. 4B.
Figure 7B:
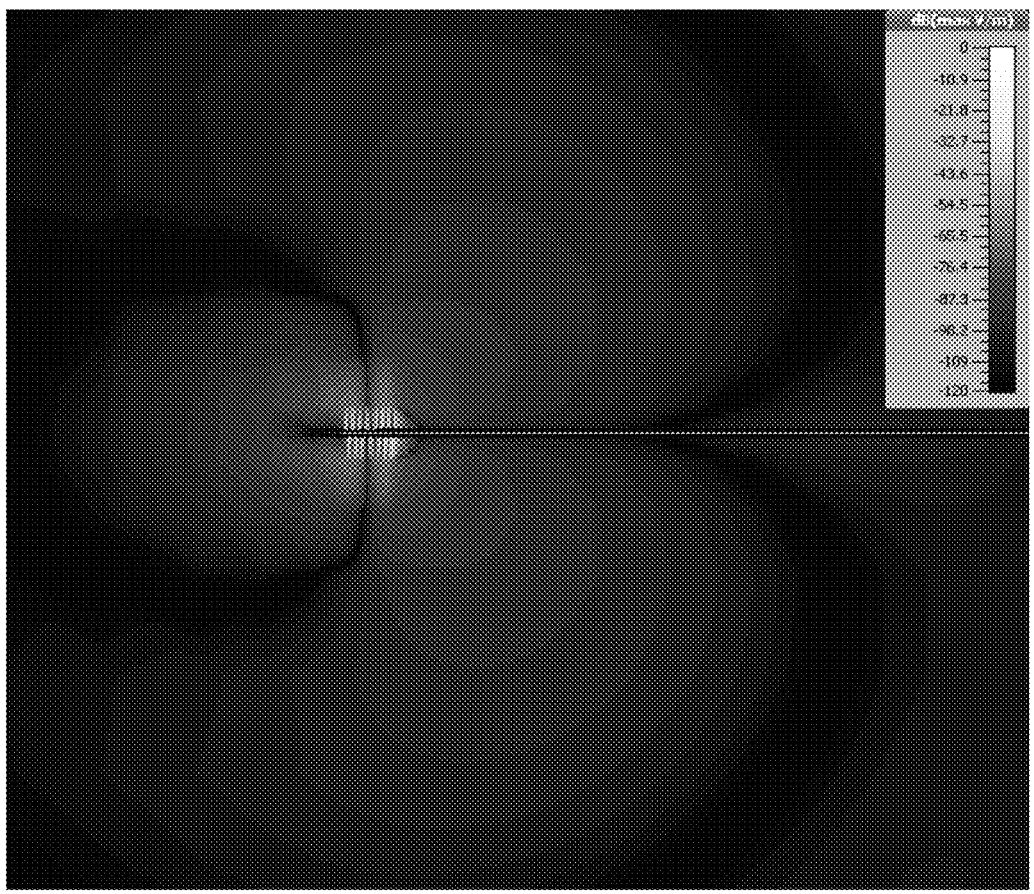
Figure 8A:
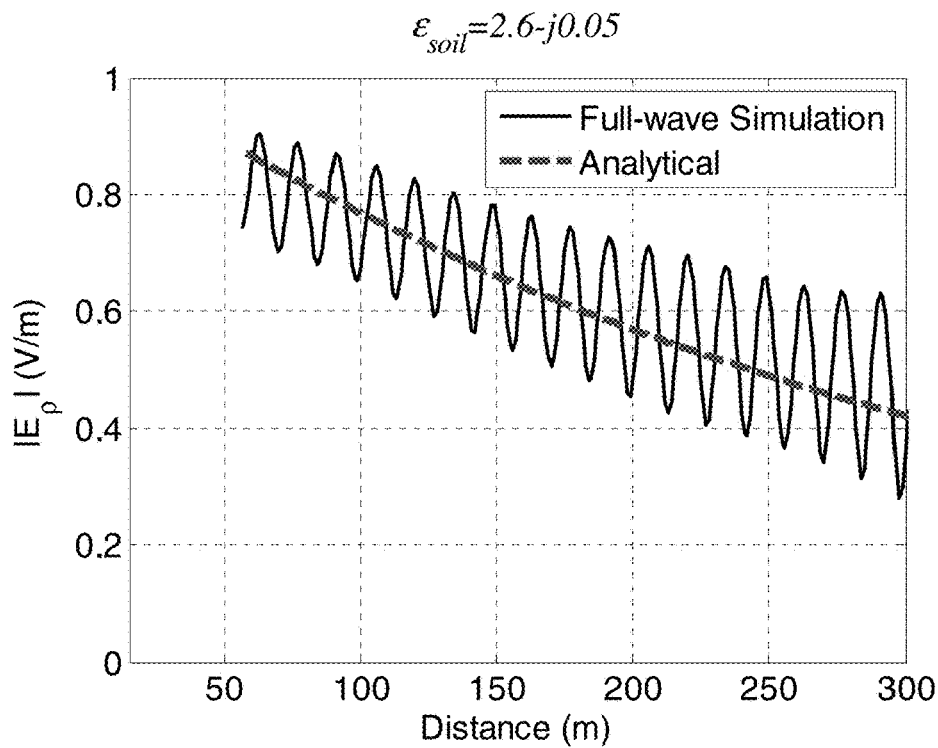
FIGS. 8A-8D are normalized graphs of the simulated radial electric field $|E_\rho|$ on the inner conductor (drill pipe) for different soil moisture conditions.
Figure 8B:
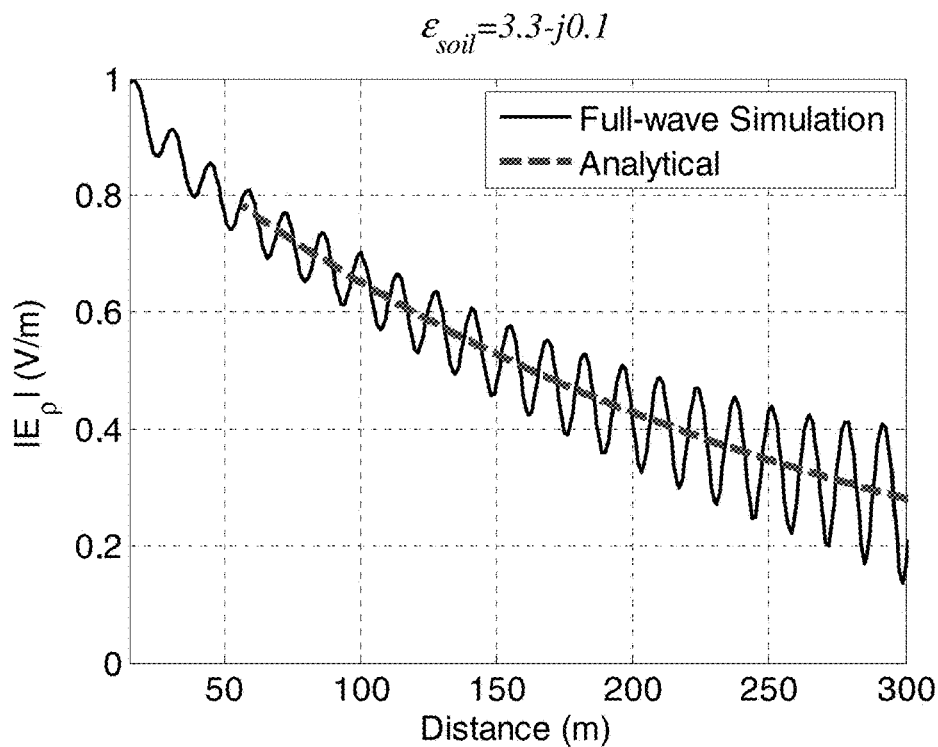
Figure 8C:
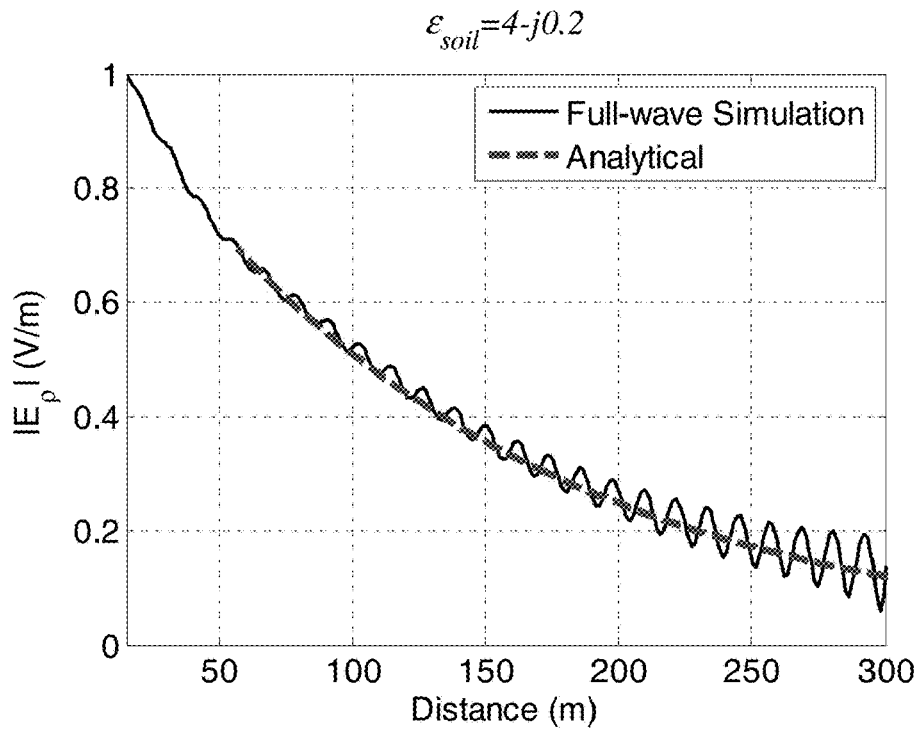
Figure 8D:
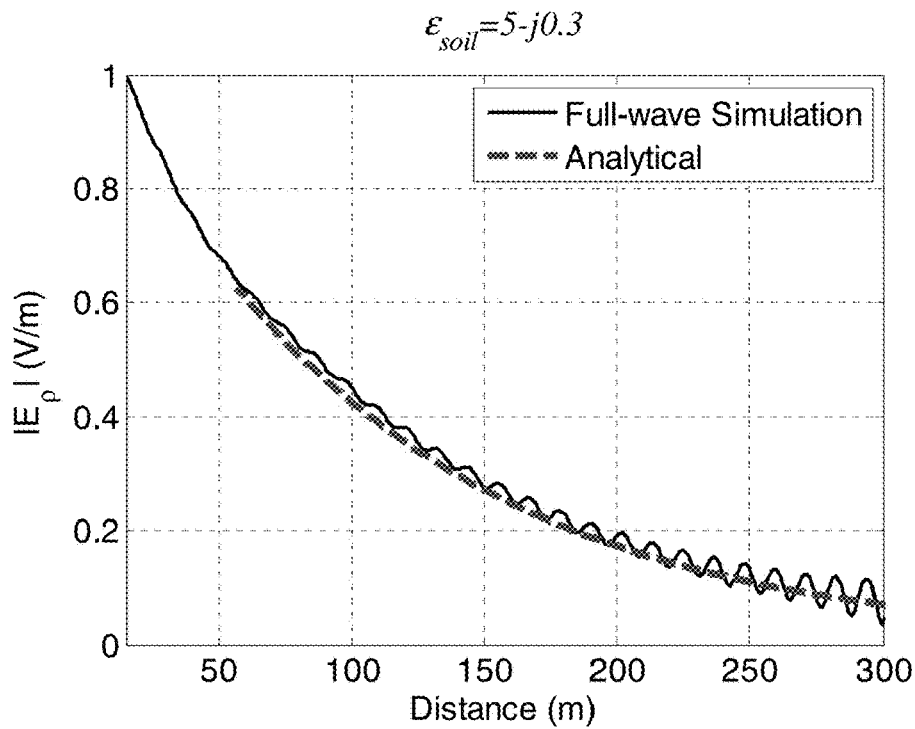
Figure 9A:
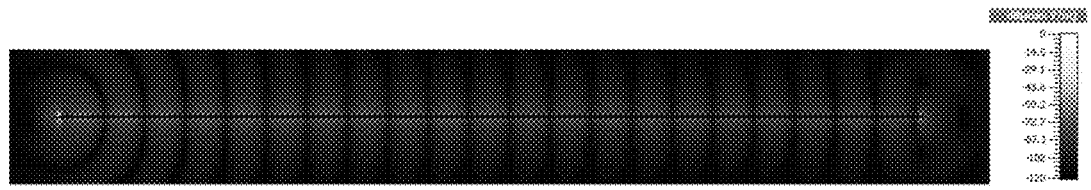
FIGS. 9A and 9B are simulations of the radial ($E_\rho$) electric field distribution and axial ($E_z$) electric field distribution, respectively, along an inner conductor (drill pipe) of length L≅10λ immersed in a soil/rock medium of permittivity $\varepsilon_{soil}$=2.6−j0.05 at f=6.3 MHz.
Figure 9B:
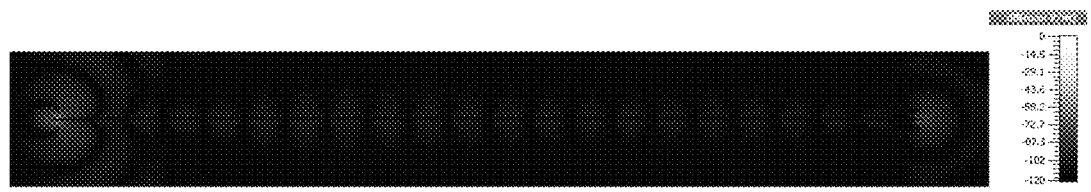
Figure 10A:
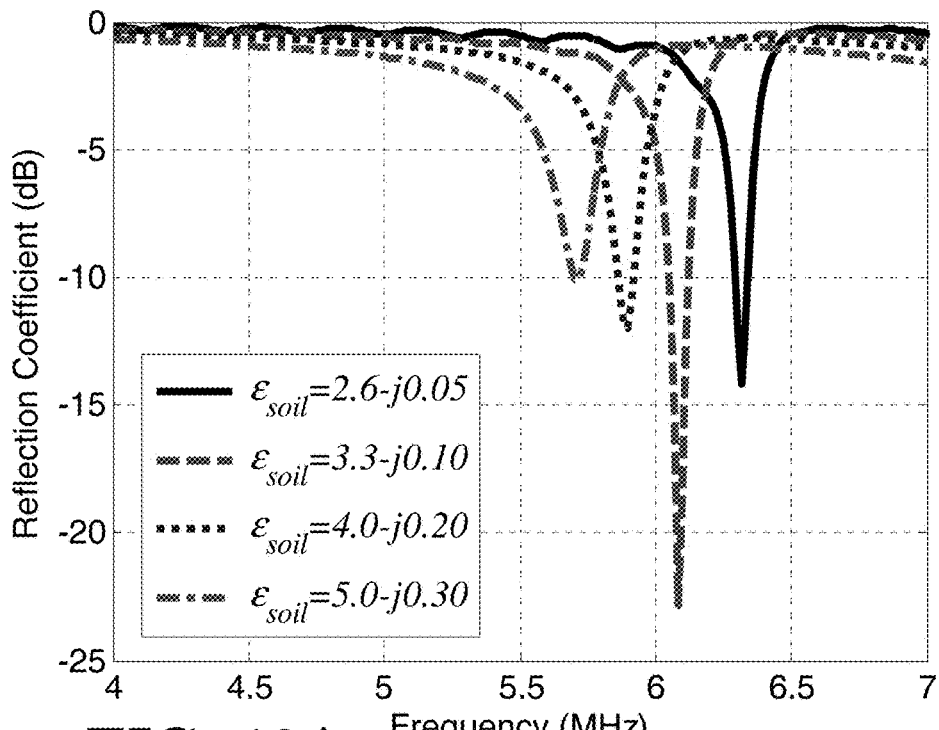
FIGS. 10A and 10B show, respectively, the simulated reflection and transmission coefficients for an inner conductor (drill pipe) of length L=300 m terminated by the transducer shown in FIG. 4B at both ends for different dielectric constants of the soil.
Figure 10B:
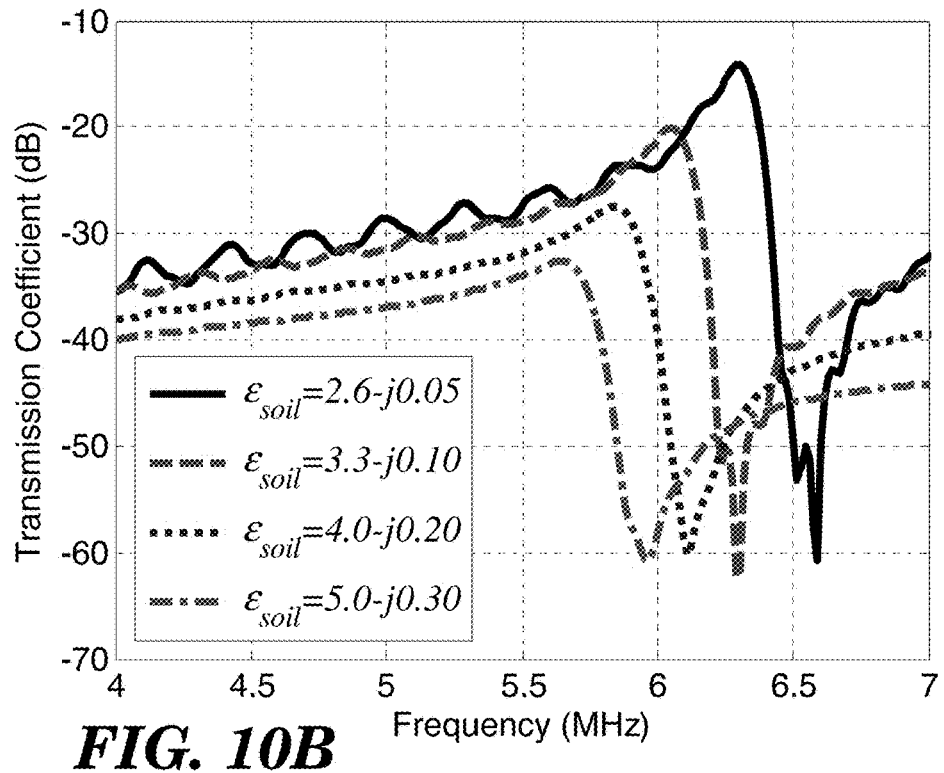

The helical conductor is loaded by a ceramic dielectric (CaMgTi) with $\varepsilon_r=20$. The current distribution on the helical conductor and on the inner conductor (drill pipe) is illustrated in FIGS. 6A and 6B, respectively. A current distribution comprising a circular component in $\varphi$-direction and an axial component in z-direction exists on the helix and on the inner conductor as well. The radial and the axial electric field around the launcher is depicted in FIGS. 7A and 7B, respectively. With reference to FIG. 7B, the generated electric field in z-direction between the adjacent loops of the helix is quite large. The magnitude of the radial electric field denoted by $E_\rho$ along the SCTL for different dielectric constants of the soil obtained by full-wave analysis is plotted in FIG. 8A ($\varepsilon_{soil}=2.6-j0.05$, f=6.3 MHz). FIG. 8B ($\varepsilon_{soil}=3.3-j0.1$, f=6.08 MHz), FIG. 8C ($\varepsilon_{soil}=4-j0.2$, f=5.9 MHz), and FIG. 8D ($\varepsilon_{soil}=5.0-j0.3$, f=5.7 MHz). Perfect agreement with the analytical solution is observed. This indicates that the desired $TM^z$ mode is excited by the launcher shown in FIG. 4B. FIG. 9 shows the radial and the axial electric field distribution along the SCTL immersed in the soil of permittivity $\varepsilon_{soil}=2.6-j0.05$ at f=6.3 MHz. The reflection and the transmission coefficients are depicted in FIG. 10A and FIG. 10B, respectively. The transmission loss can be as low as 30 dB/Km and as high as 90 dB/Km for dry and wet soil conditions. Compared to an ideal launcher, it is observed that, the proposed structure provides a minimum of 50% coupling from TEM wave to the $TM^z$ wave for $\varepsilon_{soil}=2.6-j0.05$ over 2% fractional bandwidth. The rest of the power is either radiated at the launching point or converted to other modes. As the background soil becomes more lossy, the level of coupling from TEM wave to $TM^z$ wave is decreased.

A tabulated comparison of the proposed apparatus with the existing wireless telemetry using short dipole antennas (with 100% radiation efficiency which is impossible to realize) for a transmission distance of L=300 m is provided in Table III which shows the much better performance of the proposed method. In particular, Table III shows the transmission loss of the drilling pipe-drilling mud SCTL compared with the existing short dipole antenna method at 6 MHz for a transmission distance of 300 m.

TABLE III

|  | Transmission Loss (dB) | |
| --- | --- | --- |
| $\sigma_{soil}$ ($\varepsilon_r^{soil}$ at f ≅ 6 MHz) | Dipole Antennas | Drilling pipe-Drilling mud SCTL |
| 15 µS (2.6 − j0.05) | >46.3 | 14 |
| 100 µS (5 − j0.3) | >67 | 32 |

It should be noted that the radiation efficiency of a short dipole antenna is very low and this transmission loss when using short dipole antennas is much worse than the values reported in Table III. Placement of short dipoles near and parallel to long metallic pipes further makes the impedance matching far more difficult and reduces the radiation efficiency. Complex methods such those reported in: [1] W. Hong, and K. Sarabandi, "Platform Embedded Slot Antenna backed by Shielded Parallel Plate Resonator," *IEEE Transactions on Antennas and Propagation*, vol. 58, no. 9, pp. 2850-2857, September, 2010; [2] W. Hong, and K. Sarabandi, "Low-Profile, Multi-Element, Miniaturized Monopole Antenna," *IEEE Trans. Antennas and Propagation*, pp. 72-80, vol. 57, no. 1, January 2009; [3] W. Hong, and K. Sarabandi, "Low Profile Miniaturized Planar Antenna with Omnidirectional Vertically Polarized Radiation," *IEEE Transactions on Antennas and Propagation*, pp. 1533-1540, vol. 56, no. 6, June 2008; and [4] W. Hong, N. Behdad, and K. Sarabandi, "Size Reduction of Cavity-Backed Slot Antennas," *IEEE Transactions on Antennas and Propagation*, vol. 54, no. 5, pp. 1461-1465, May 2006 may be implemented to alleviate these drawbacks to some extent. As the surrounding soil/rock becomes lossier, the transmission loss increases for both techniques.

Figure 11:
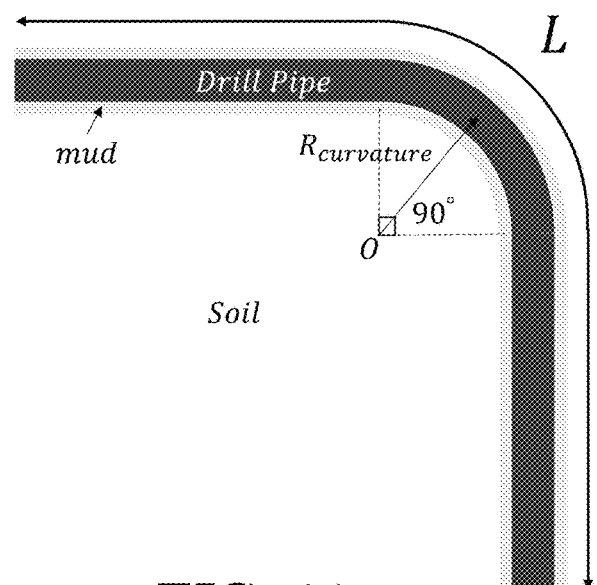
FIG. 11 depicts a 90° bend of an inner conductor (drill pipe) of total length L=150 m which is analyzed by a full-wave solver to examine the bend effect for different radii of curvature.
Figure 12A:
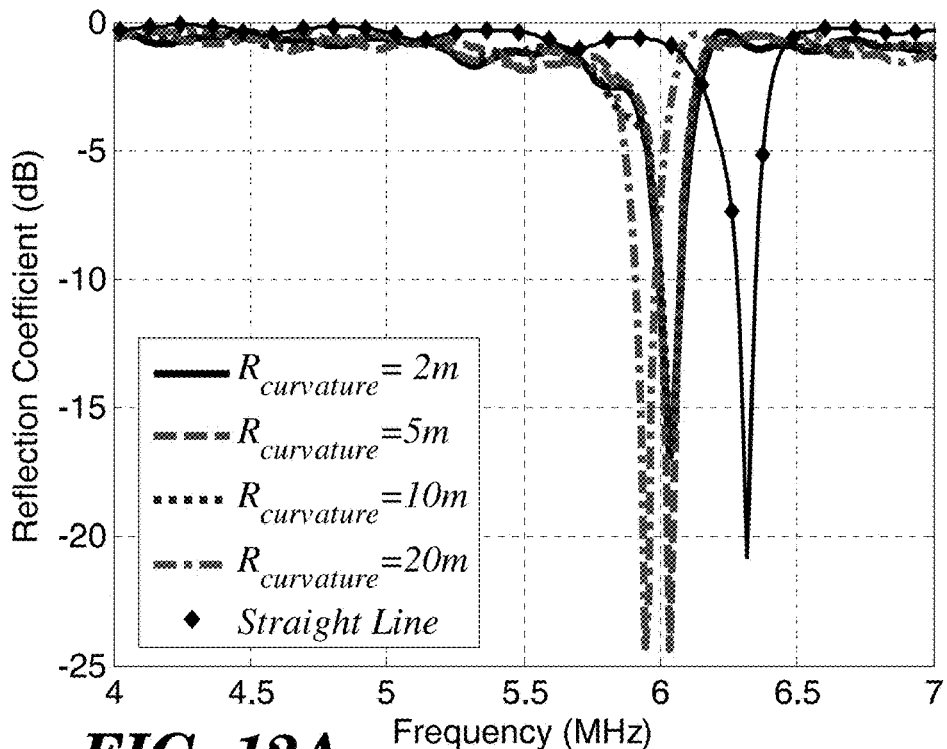
FIGS. 12A and 12B show, respectively, the simulated reflection and transmission coefficients for an inner conductor (drill pipe) of length L=150 m as shown in FIG. 11 terminated by the transducer shown in FIG. 4B at both ends for different radii of curvature.
Figure 12B:
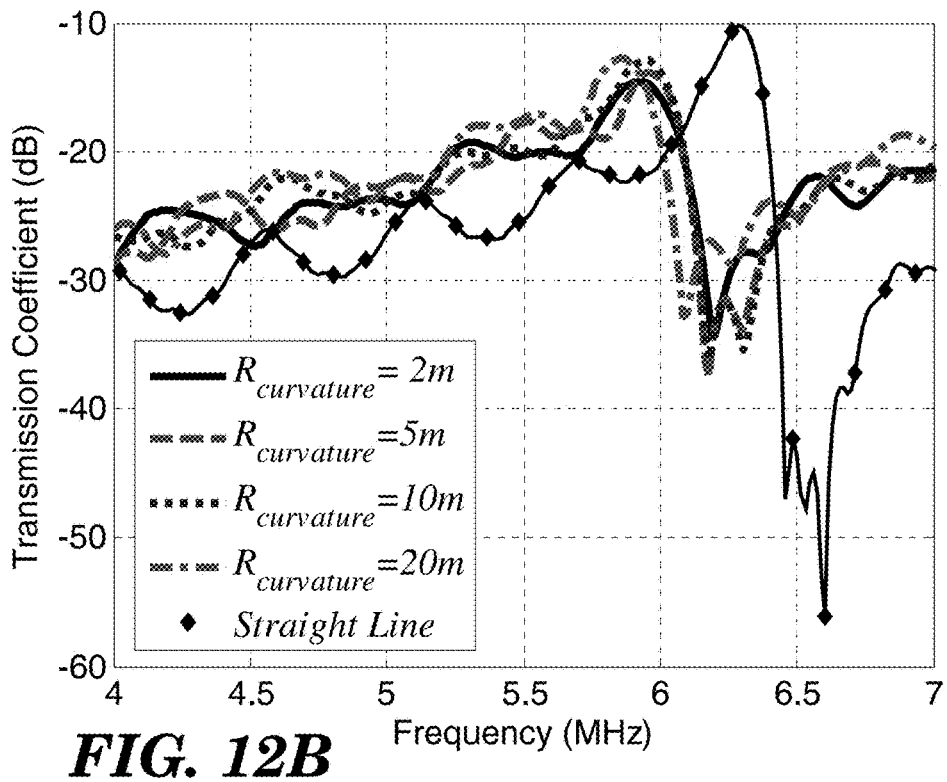
Figure 13:
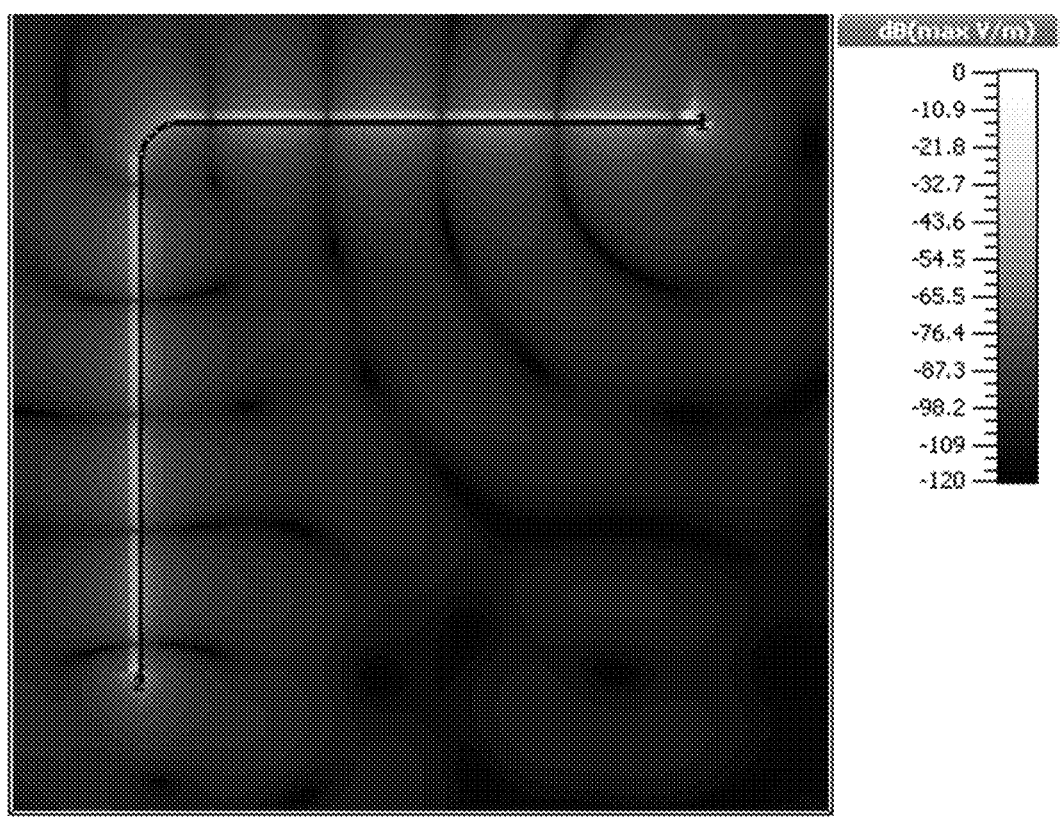
FIG. 13 is a simulation of electric field distribution (|E|) along a 90°-bend ($R_{curvature}$=0.16λ=5 m) on a 5λ-long inner conductor (drill pipe) immersed in a soil/rock medium of permittivity $\varepsilon_{soil}$=2.6−j0.05 at f=5.9 MHz.

In the above analysis, the drill pipe transmission line was assumed to be straight. This was used to validate the launcher performance and the validity of the numerical simulations through a direct comparison with analytical results. However, in most practical situations, there are bends and curvatures along the drilling path. The effect of curvature on the SCTL response can be examined using an EM simulation tool. Consider the 90° bend SCTL shown in FIG. 11 which is terminated by the launcher of FIG. 4B at both ends. Keeping the total length of the line as L≅5λ=150 m, the reflection and the transmission coefficients for different radii of curvatures are obtained by a full-wave simulator and are demonstrated in FIGS. 12A and 12B. Also, shown is the reflection and transmission coefficients for the straight SCTL of the same length. The effect of the curvature compared to the straight line of the same length reveals two phenomena: 1) the resonant frequency shifts down by about 7% and, 2) the transmission loss is increased. The shift of the resonant frequency is due to the reflection from the bend and the interactions between the bend and the launcher. The transmission loss is mostly due to the radiation from the bend itself. The more acute the bend, the more the radiation occurs. However, since the refractive index of the mud is much larger than that of the background soil, the wave is partly guided along the curvature. The radiation loss for this line, due to the curvature is found to be about 2.5 dB for $R_{curvature}$=0.06λ where λ is the wavelength in the background soil at the corresponding resonant frequency. The electric field distribution along the 90° bend SCTL of curvature $R_{curvature}$=0.15λ=5 m and length L≅5λ=150 m submerged in the soil of permittivity $\varepsilon_{soil}$=2.6−j0.05 is depicted in FIG. 13 which indicates that the wave is steered along the curvature.

The frequency of operation needs to be slightly adjusted as the drill is moving downhole. Therefore, the reflection coefficient should be monitored to select the appropriate channel for data transmission.

Figure 14:
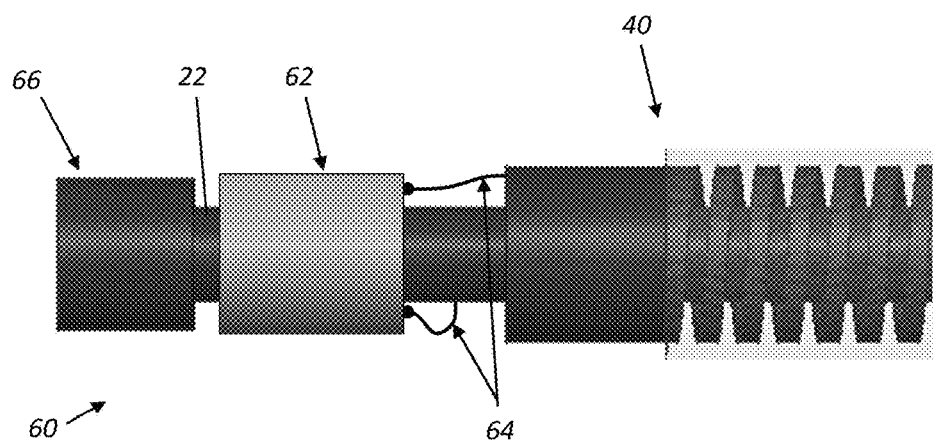
FIG. 14 diagrammatically depicts a drill head that includes a drill bit, communication module, and (a partial view of) a transducer as shown in FIG. 4B.

FIG. 14 depicts a drill head 60 such as shown in FIG. 4B, but with a communication module 62 used for obtaining sensor data at the drill head 60 and energizing the transducer 40 to send the data over the drill pipe 22 as a SCTL. The communication module 62 is shown as an integrated sensor and transceiver module that is positioned adjacent the drill bit 66 of the drill head 60 and is electrically connected to both the transducer 40 and drill pipe 22 for use in communicating to and from the module using the transducer 40. Thus, it includes two output terminals with electrical connections 64 shown diagrammatically, it being understood that the actual electrical connection to the drill pipe 22 and transducer 40 may be done differently, such as direct connections without wires 64. In this regard, the communication module 62 may be physically integrated together with the transducer 40. The communication module 62 can be implemented using conventional downhole drill head sensor and transmission circuitry, as is already known to those skilled in the art. In this regard, the communication module 62 may be a single integrated module that includes one more sensors and communication circuitry for sending and receiving data via the transducer 40, or may comprise separate physical components such as one packaged sensor module and a separately packaged transmission module connected to the sensor module to receive sensor data, with the two modules together comprising the communication module 62.

Figure 15:
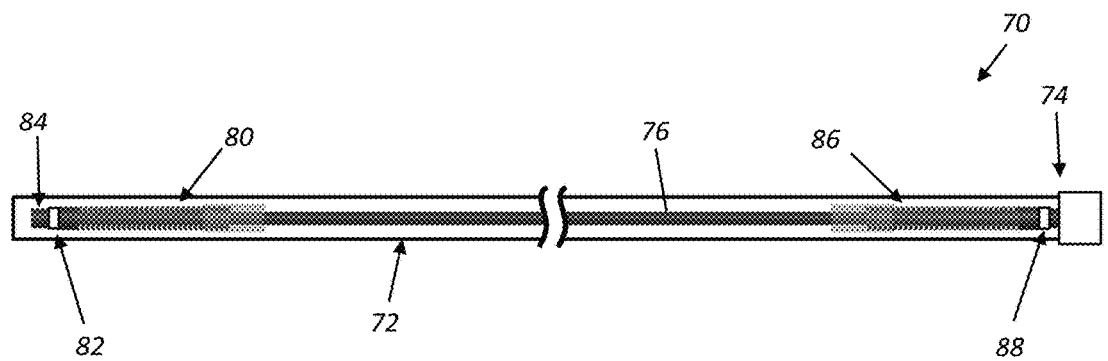
FIG. 15 depicts a borehole with a drill pipe and two transducers as shown in FIG. 4B—one at the drill head and the other at the bore head to allow communication at the bore opening to and from the communication module at the drill head.

FIG. 15 shows a borehole drilling communication system 70 during use when drilling a borehole 72. At the surface of the soil/ground is the bore head 74 that includes the necessary drilling rig equipment to feed the drill pipe 76 into the borehole 72, supply the pressurized drilling fluid, etc., as well as to receive and send communications down the borehole 72. The system 70 includes a first transducer 80 such as described above in connection with FIGS. 4B and 14, as well as a sensor/transceiver communication module 82 and drill bit 84, all located downhole at the drill head. The system 70 further includes a second transducer 86 that may be implemented the same as that of FIGS. 4B and 14, with the second transducer 86 located at the borehole surface opening still in contact with the mud exiting the borehole 72. Data generated by the communication module's (82) radio transceiver is used to energize the first transducer 80, resulting in TM waves that propagate through the mud along the length of the drill pipe 76 until they are received by the second transducer 86 and a second transceiver 88 located at the surface. Similarly, commands and/or data may be sent from the surface to the drill head via the second transceiver 88 and second transducer 86 to the first transducer 80 and thus, to the communication module 82. Thus, either one-way or bi-directional communication may be carried out downhole.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A transducer for generating transverse magnetic (TM) waves on a single conductor transmission line, comprising:
 a cylindrical conductor extending coaxially over a central axis of a single conductor transmission line from an input end to a free end, wherein the single conductor transmission line and a portion of the cylindrical conductor form a coaxial line at the input end, and wherein a remaining portion of the cylindrical conductor from the input end to the free end is a helical conductor and concentrically surrounds the single conductor transmission line to form a helical line; and
 an attachment structure connected to the helical conductor for mounting the helical conductor on the single conductor transmission line, wherein the attachment structure includes at least one dielectric material and wherein a portion of the attachment structure is configured to fit over and seal the helical conductor;
 wherein the coaxial line and the helical line generate a TM wave onto the single conductor transmission line when electrically energized at the input end.

2. A transducer as defined in claim 1, wherein the at least one dielectric material is embedded between the helical conductor and the single conductor transmission line to support the helical conductor.

3. A transducer as defined in claim 2, wherein the attachment structure physically connects the input end of the helical conductor to the single conductor transmission line while electrically isolating the helical conductor from the single conductor transmission line.

4. A transducer as defined in claim 3, wherein the at least one dielectric material supports the helical conductor at least at the free end.

5. A transducer as defined in claim 1, wherein the input end is electrically energized by a communications module operatively coupled to the input end.

6. A transducer as defined in claim 5, wherein the input end is configured to receive data from the communications module and convert the data into TM waves that travel along the single conductor transmission line.

7. A transducer as defined in claim 5, wherein the single conductor transmission line is a drill pipe.

8. A borehole drilling communication system, comprising:
 a hydraulic drill that includes a drill pipe extending from a first end to a second end, and having a drill head located at the second end of the drill pipe, wherein the drill head includes a drill bit configured to be hydraulically actuated using fluid forced through the drill pipe to the drill head, and wherein the fluid exiting the drill head mixes with soil displaced by the drill bit forming a mud that coats the drill pipe;
 a communication module located on the drill pipe at the drill head;
 a transducer having an input end and being mounted on the drill pipe at the drill head adjacent the communication module, wherein the communication module includes a first output terminal electrically connected to the drill pipe and a second output terminal electrically connected to the input end of the transducer;
 wherein the transducer comprises a helical conductor that is positioned coaxially over a section of the drill pipe at the drill head and that extends helically over the drill pipe for a distance from the input end and in a direction away from the second end of the drill pipe, the helical conductor terminating at an electrically isolated free end;
 whereby, during use in borehole drilling, data sent from the communication module is launched by the transducer and transmitted along the drill pipe through the mud as a single conductor transmission line.

9. A borehole drilling communication system as defined in claim 8, wherein the transducer further comprises a dielectric material fixing the helical conductor in position along the drill pipe.

10. A borehole drilling communication system as defined in claim 8, wherein, in use the transducer converts the data from the communication module into transverse magnetic (TM) waves that travel along the drill pipe through the mud towards its first end for reception at a surface opening of the borehole.

11. A borehole drilling communication system as defined in claim 8, wherein the transducer comprises a first transducer, and wherein the communication system further comprises a second transducer having a second helical conductor mounted on the drill pipe near the first end for receiving the data launched by the first transducer.

12. A borehole drilling communication system as defined in claim 8, wherein the communication module comprises a transceiver for communication of data to and from the module via the transducer.

13. A borehole drilling communication system as defined in claim 8, wherein the communication module includes at least one sensor for measuring data at or adjacent the drill head.

14. A method of communicating data from a borehole drill head while drilling in soil, comprising the steps of:
 (a) boring into soil using a hydraulic drill pipe having a drill head located at an end of the drill pipe, wherein the drill head includes a drill bit that is hydraulically actuated using fluid forced through the drill pipe to the drill head, and wherein the fluid exiting the drill head mixes with soil displaced by the drill bit forming a mud that coats the drill pipe; and
 (b) sending data from the drill head by generating transverse magnetic (TM) waves using a transducer having a helical conductor extending coaxially over the drill pipe such that the TM waves propagate along the drill pipe through the mud using the drill pipe as a single conductor transmission line.

15. The method of claim 14, wherein step (b) further comprises sending the data at a frequency selected in accordance with a length of the helical conductor, a pitch of turns in the helical conductor, or both.

16. The method of claim 14, wherein step (a) forms a borehole in the soil and wherein the transducer is sized to fit within the borehole.

\* \* \* \* \*